United States Patent
Wang et al.

(10) Patent No.: US 10,578,943 B2
(45) Date of Patent: Mar. 3, 2020

(54) ADDITIVE PARTICLES FOR IMPROVING OPTICAL PERFORMANCE OF AN ELECTROPHORETIC DISPLAY

(71) Applicant: E INK CALIFORNIA, LLC, Fremont, CA (US)

(72) Inventors: Ming Wang, Fremont, CA (US); Yu Li, Fremont, CA (US); Hui Du, Milpitas, CA (US); Haiyan Gu, Fremont, CA (US); Roman Ivanov, Aurora, IL (US); Robert A. Sprague, Saratoga, CA (US); HongMei Zang, Fremont, CA (US); Xiaojia Zhang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 15/687,786

(22) Filed: Aug. 28, 2017

(65) Prior Publication Data

US 2017/0357137 A1 Dec. 14, 2017

Related U.S. Application Data (63) Continuation of application No. 15/003,661, filed on Jan. 21, 2016, now Pat. No. 9,778,537, which is a
(Continued)

(51) Int. Cl.
*G02B 26/00* (2006.01)
*G02F 1/167* (2019.01)
*G02F 1/1675* (2019.01)

(52) U.S. Cl.
CPC ...... *G02F 1/167* (2013.01); *G02F 2001/1678* (2013.01)

(58) Field of Classification Search
CPC ............ G02F 1/167; G02F 2001/1678; G02F 1/0105; G02F 1/1335
(Continued)

(56) References Cited

U.S. PATENT DOCUMENTS 3,808,550 A * 4/1974 Ashkin .................... H01S 3/08
250/251
5,298,833 A 3/1994 Hou
(Continued)

FOREIGN PATENT DOCUMENTS

JP 2000231126 A 8/2000
JP 2006343458 A 12/2006
(Continued)

OTHER PUBLICATIONS

Zang, H.M., "Monochrome and Area Color Microcup EPDs by Roll-to-Roll Manufacturing Process", Presentation conducted at the Fourth Organic Electronics Conference and Exhibition (OEC-06), Frankfurt, Germany, (Sep. 25-27, 2006).
(Continued)

*Primary Examiner* — Brandi N Thomas
(74) *Attorney, Agent, or Firm* — Ioannis Constantinides (57) ABSTRACT

The present invention is directed to an electrophoretic fluid which comprises additive particles. The concentration of the additive particles in the electrophoretic fluid does not exceed 25% by weight and the additive particles are not seen at the viewing side during operation of the display. The resulting fluid can improve optical performance of a display device, such as image stability and contrast ratio. The present invention is also directed to an electrophoretic display comprising the electrophoretic fluid.

17 Claims, 3 Drawing Sheets

Related U.S. Application Data continuation-in-part of application No. 14/535,172, filed on Nov. 6, 2014, now Pat. No. 9,423,666, which is a continuation-in-part of application No. 13/243,751, filed on Sep. 23, 2011, now Pat. No. 8,902,491, said application No. 15/003,661 is a continuation-in-part of application No. 14/179,458, filed on Feb. 12, 2014, now abandoned.

(60) Provisional application No. 61/765,550, filed on Feb. 15, 2013.

(58) Field of Classification Search
USPC ........ 359/237, 242, 265–267, 290–292, 295, 359/296, 298
See application file for complete search history.

(56) References Cited

U.S. PATENT DOCUMENTS

| | | | |
|---|---|---|---|
| 5,643,673 | A | 7/1997 | Hou |
| 5,707,738 | A | 1/1998 | Hou |
| 5,961,804 | A | 10/1999 | Jacobson |
| 6,693,621 | B1 | 2/2004 | Hayakawa |
| 6,751,008 | B2 | 6/2004 | Liang |
| 6,930,818 | B1 | 8/2005 | Liang |
| 6,987,603 | B2 | 1/2006 | Paolini, Jr. |
| 7,116,467 | B2 | 10/2006 | Kornbrekke |
| 7,170,670 | B2 | 1/2007 | Webber |
| 7,433,113 | B2 | 10/2008 | Chopra |
| 7,609,435 | B2 | 10/2009 | Moriyama |
| 7,706,051 | B2 | 4/2010 | Hattori |
| 7,880,955 | B2 | 2/2011 | Naijo |
| 7,933,062 | B2 * | 4/2011 | Masuzawa ............ G02F 1/167 345/107 |
| 8,040,594 | B2 | 10/2011 | Paolini, Jr. |
| 8,067,305 | B2 | 11/2011 | Zafiropoulo |
| 8,115,729 | B2 | 2/2012 | Danner |
| 8,462,423 | B2 | 6/2013 | Farrand |
| 8,547,394 | B2 | 10/2013 | Swic |
| 8,565,522 | B2 | 10/2013 | Swic |
| 8,570,639 | B2 | 10/2013 | Masuzawa |
| 8,574,937 | B2 | 11/2013 | Shi |
| 8,670,174 | B2 | 3/2014 | Sprague |
| 8,674,978 | B2 | 3/2014 | Komatsu |
| 8,717,664 | B2 | 5/2014 | Wang |
| 8,902,491 | B2 | 12/2014 | Wang |
| 9,146,439 | B2 | 9/2015 | Zhang |
| 9,170,468 | B2 | 10/2015 | Lin |
| 9,383,623 | B2 | 7/2016 | Lin |
| 9,423,666 | B2 | 8/2016 | Wang |
| 2004/0257635 | A1 * | 12/2004 | Paolini, Jr. ............ G02F 1/167 359/296 |
| 2008/0042928 | A1 | 2/2008 | Schlangen |
| 2008/0237550 | A1 | 10/2008 | Yang |
| 2011/0175939 | A1 | 7/2011 | Moriyama |
| 2011/0285713 | A1 | 11/2011 | Swic |
| 2011/0285756 | A1 * | 11/2011 | Sato ............ G09G 3/2003 345/690 |
| 2012/0229885 | A1 * | 9/2012 | Chen ............ G02F 1/167 359/296 |
| 2014/0231728 | A1 | 8/2014 | Du |
| 2015/0103394 | A1 | 4/2015 | Wang |
| 2016/0139483 | A1 | 5/2016 | Wang |

FOREIGN PATENT DOCUMENTS

| | | |
|---|---|---|
| JP | 2011158783 A | 8/2011 |
| KR | 20110103765 A | 9/2011 |
| TW | 201237529 A | 9/2012 |

OTHER PUBLICATIONS

Ho, Andrew, "Embedding e-Paper in Smart Cards, Pricing Labels & Indicators", Presentation conducted at Smart Paper Conference, Atlanta, GA, USA (Nov. 15-16, 2006).

Zang, H.M., "Developments in Microcup Flexible Displays", Presentation conducted at the 6th Annual Flexible Display and Microelectronics Conference, Phoenix, AZ, Feb. 6-8, 2007.

Zang, H.M. et al., "Microcup e-Paper for Embedded and Flexible Designs", IDMC'07, Taipei International Convention Center, Taiwan, (Jul. 2007).

Sprague, R.A., "SiPix Microcup Electrophoretic Epaper for Ebooks", NIP 25, 2009, pp. 460-462; (Sep. 23, 2009). (Presentation conducted on Sep. 23, 2009 at the 25th Int'l Conference on Digital Printing Technologies,Louisville, Kentucky, USA.).

Seigou Kawaguchi et al., "Synthesis of polyethylene macromonomers and their radical copolymerizations with methyl methacrylate in homogeneous and oligoethylene melts media" Designed Monomers and Polymers 2000, vol. 3, No. 3, p. 263-277.

Liang, R.C., "BreakThrough-Newly-Developed Color Electronic Paper Promises—Unbeatable Production Efficiency", Nikkei Microdevices, p. 3 (Dec. 2002). (in Japanese, with English translation).

Liang, R.C. et al., "Microcup Electrophoretic Displays by Roll-to-Roll Manufacturing Processes", IDW '02, Paper EP2-2, pp. 1337-1340, (Dec. 2002).

Liang, R.C., "Microcup Electrophoretic and Liquid Crystal Displays by Roll-to-Roll Manufacturing Processes", Presented at Flexible Microelectronics & Displays Conference of U.S. Display Consortium, Phoenix, Arizona, USA (Feb. 2003).

Liang, R.C., "Microcup LCD, A New Type of Dispersed LCD by A Roll-to-Roll Manufacturing Process", Presented at IDMC , Paper We-02-04, pp. 1-4, Taipei, Taiwan, (Feb. 2003).

Liang, R.C. et al., "Passive Matrix Microcup Electrophoretic Displays", IDMC'03, Paper FR-17-5, p. 1-4, Taipei, Taiwan, (Feb. 2003).

Liang, R.C.et al., "Microcup Displays: Electronic Paper by Roll-to-Roll Manufacturing Processes" Journal of the SID, 11 (4), pp. 621-628, (Feb. 2003).

Chen, S.M., "Revolution electronic paper: The New Application and the Dynamics of Companies", Topology Research Institute, pp. 1-10, (May 2003). (In Chinese, English abstract attached).

Liang, R.C. et al., "Microcup Active and Passive Matrix Electrophoretic Displays by A Roll-to-Roll Manufacturing Processes", SID 03 Digest, Paper 20.1, pp. 838-841 (May 2003).

Lee, H. et al., "SiPix Microcup Electronic Paper—An Introduction" Advanced Display, Issue 37, pp. 4-9, (Jun. 2003). (in Chinese, English abstract attached).

Chen, S.M., "The Applications for the Revolutionary Electronic Paper Technology", OPTO News & Letters, 102, pp. 37-41 (Jul. 2003). (in Chinese, English abstract attached).

Zang, H.M. et al., "Microcup Electronic Paper by Roll-to-Roll Manufacturing Processes", The Spectrum, 16(2), pp. 16-21 (2003).

Allen, K., "Electrophoretics Fulfilled. Emerging Displays Review: Emerging Display Technologies, Monthly Report", Stanford Resources Display Insight, pp. 9-14 (Oct. 2003).

Kleper, M. et al., "An Investigation of the Emerging and Developing Technologies Related to the Generation Beyond Print-on-Paper", Advanced Display Technologies, Rochester Institute of Technology, pp. 13-15, (Oct. 2003).

Zang, H.M., "Microcup Electronic Paper by Roll-to-Roll Manufacturing Processes", Presentation at the Advisory Board Meeting, Bowling Green State Univ., Ohio, USA (Oct. 2003).

Chung, J. et al., "Microcup Electrophoretic Displays, Grayscale and Color Rendition", IDW, AMD2 & EP1-2, pp. 243-246 (Dec. 2003).

Ho, C. et al., "Microcup Electronic Paper by Roll-to-Roll Manufacturing Processes", Presentation conducted at FEG, Nei-Li, Taiwan, (Dec. 2003).

Zang, H.M. et al., "Threshold and Grayscale Stability of Microcup Electronic Paper", SPIE vol. 5289, pp. 102-108, (Jan. 2004).

Zang, H.M., "Microcup Electronic Paper", Presentation at the Displays & Microelectronics Conference of U.S. Display Consortium, Phoenix, Arizona, USA (Feb. 2004).

(56) References Cited

OTHER PUBLICATIONS

Wang, X. et al., "Microcup Electronic Paper and the Converting Processes", ASID, 10.1.2-26, pp. 396-399, Nanjing, China, (Feb. 2004).

Chaug, Y.S. et al., "Roll-to-Roll Processes for the Manufacturing of Patterned Conductive Electrodes on Flexible Substrates", Mat. Res. Soc. Symp. Proc., vol. 814, I9.6.1., (Apr. 2004).

Liang, R.C., "Microcup Electronic Paper by Roll-to-Roll Manufacturing Process", Presented at the Flexible Displays & Electronics 2004 of Intertech, San Fransisco, California, USA, (Apr. 2004).

Hou, J. et al., "Reliability and Performance of Flexible Electrophoretic Displays by Roll-to-Roll Manufacturing Processes", SID Digest, 32.3, pp. 1066-1069 (May 2004).

Wang, X. et al., "Microcup Electronic Paper and the Converting Processes", Advanced Display, Issue 43, pp. 48-51 (Jun. 2004). (in Chinese, with English abstract).

Liang, R.C. et al., "Format Flexible Microcup Electronic Paper by Roll-to-Roll Manufacturing Process", Presented at 14th FPD Manufacturing Technology EXPO & Conference, Tokyo, Japan, (Jun. 30, 2004-Jul. 2, 2004).

Liang, R.C., "Flexible and Rollable Displays/Electronic Paper—A Technology Overview", Presented at the METS Conference, Taipei, Taiwan, (Oct. 2004).

Bardsley, J.N. et al., "Microcup Electrophoretic Displays", USDC Flexible Display Report, 3.1.2. pp. 3-12 to 3-16, (Nov. 2004).

Ho, Candice, "Microcup Electronic Paper Device and Application", Presentation conducted at USDC 4th Annual Flexible Display and Microelectronics Conference, Phoenix, Arizona, USA, (Feb. 1, 2005).

Zang, H.M. et al., "Flexible Microcup EPD by RTR Process", Presentation conducted at 2nd Annual Paper-Like Displays Conference, St. Pete Beach, Florida, USA, (Feb. 9-11, 2005).

Liang, R.C., "Flexible and Roll-able Displays/Electronic Paper—A Brief Technology Overview", Presentation at Flexible Display Forum, Taiwan (Feb. 2005).

Wang, X. et al., "Inkjet Fabrication of Multi-Color Microcup Electrophorectic Display", 5th Flexible Microelectronics & Displays Conference of U.S. Display Consortium, Phoenix, AZ, USA, (Feb. 2006).

Zang, H.M., et al., "Monochrome and Area Color Microcup EPDs by Roll-to-Roll Manufacturing Processes", ICIS 06 International Congress of Imaging Science Final Program and Proceedings, pp. 362-365, Rochester, New York, USA (May 2006).

Wang, X. et al., "Roll-to-Roll Manufacturing Process for Full Color Electrophoretic Film", SID 06 Digest, vol. 37, Issue 1, pp. 1587-1589, (Jun. 2006).

\* cited by examiner

Figure 2b (Invention)

Figure 2a (Previous Configuration)

ADDITIVE PARTICLES FOR IMPROVING OPTICAL PERFORMANCE OF AN ELECTROPHORETIC DISPLAY

This application is a continuation of U.S. application Ser. No. 15/003,661, filed Jan. 21, 2016, which is a continuation-in-part of U.S. application Ser. No. 14/535,172, filed Nov. 6, 2014, now U.S. Pat. No. 9,423,666; which is a continuation-in-part of U.S. application Ser. No. 13/243,751, filed Sep. 23, 2011, now U.S. Pat. No. 8,902,491. U.S. application Ser. No. 15/003,661 is also a continuation-in-part of U.S. application Ser. No. 14/179,458, filed Feb. 12, 2014; which claims priority to U.S. Provisional Application No. 61/765,550, filed Feb. 15, 2013. The above-identified applications are incorporated herein by reference in their entireties.

FIELD OF THE INVENTION

The present invention is directed to an electrophoretic fluid, in particular, an electrophoretic fluid comprising additive particles for improving optical performance of an electrophoretic display.

BACKGROUND OF THE INVENTION

An electrophoretic display (EPD) is a non-emissive device based on the electrophoresis phenomenon influencing charged pigment particles suspended in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the particles to migrate to the opposite plate, thereby reversing the color.

Alternatively, an electrophoretic fluid may have two types of pigment particles of contrasting colors and carrying opposite charges and the two types of pigment particles are dispersed in a clear solvent or solvent mixture. In this case, when a voltage difference is imposed between the two electrode plates, the two types of pigment particles would move to opposite ends. Thus one of the colors of the two types of the pigment particles would be seen at the viewing side.

Further alternatively, multiple types of charged pigment particles may be present in an electrophoretic fluid for forming a highlight or full color display device.

In an ideal fluid, the charged pigment particles remain separate and do not agglomerate or stick to each other or to the electrodes, under all operating conditions. In addition, all components in the fluid must be chemically stable and compatible with other materials present in an electrophoretic display.

For all types of the electrophoretic displays, the fluid contained within the individual display cells of the display is undoubtedly one of the most crucial parts of the device. The composition of the fluid determines, to a large extent, the lifetime, contrast ratio, switching rate and bistability of the device.

Prior to the present invention, it was proposed that the image stability of an electrophoretic display may be improved by adding a polymer additive into an electrophoretic fluid. The polymer additive is either completely dissolved in the fluid or partially dissolved in the fluid to form micelle aggregates. However the usefulness of this approach is limited because adding a polymer additive to the fluid would inevitably increase the viscosity of the fluid, resulting in an increase of the switching time.

SUMMARY OF THE INVENTION

The present invention is directed to an electrophoretic fluid comprising charged pigment particles and additive particles, all of which are dispersed in a solvent or solvent mixture. The additive particles may be opaque or transparent.

In a first aspect of the present invention, the additive particles are uncharged or slightly charged neutral buoyancy particles. In one embodiment, the fluid comprises two types of charged pigment particles of contrasting colors and carrying opposite charge polarities. In one embodiment, the two types of charged pigment particles are black and white, respectively. In one embodiment, the uncharged or lightly charged neutral buoyancy particles have the same color as one of the two types of charged pigment particles. In one embodiment, the uncharged or lightly charged neutral buoyancy particles have a color different from either one of the two types of charged pigment particles. In one embodiment, the fluid comprises only one type of charged pigment particles.

In one embodiment, the lightly charged neutral buoyancy particles carry a charge which is less than 50%, preferably less than 25% and more preferably less than 10%, of the average charge carried by the positively or negatively charged pigment particles.

In one embodiment, uncharged or lightly charged neutral buoyancy particles are formed from a material selected from the group consisting of polyacrylate, polymethacrylate, polystyrene, polyaniline, polypyrrole, polyphenol and polysiloxane. In one embodiment, the uncharged or lightly charged neutral buoyancy particles are formed from a material selected from the group consisting of poly(pentabromophenyl methacrylate), poly(2-vinylnapthalene), poly(naphthyl methacrylate), poly(alpha-methystyrene), poly(N-benzyl methacrylamide) and poly(benzyl methacrylate).

In one embodiment, the uncharged or lightly charged neutral buoyancy particles are formed from a material having a refractive index different from that of the solvent or solvent mixture. In one embodiment, the uncharged or lightly charged neutral buoyancy particles are formed from a material having a refractive index higher than that of the solvent or solvent mixture.

In one embodiment, the uncharged or lightly charged neutral buoyancy particles are core-shell particles. In one embodiment, the core particle is formed from an organic or inorganic pigment. In one embodiment, the shell is formed from a material selected from the group consisting of polyacrylate, polymethacrylate, polystyrene, polyaniline, polypyrrole, polyphenol and polysiloxane. In one embodiment, the shell is formed from a material selected from the group consisting of poly(pentabromophenyl methacrylate), poly(2-vinylnapthalene), poly(naphthyl methacrylate), poly(alpha-methystyrene), poly(N-benzyl methacrylamide) and poly(benzyl methacrylate).

In one embodiment, the size of the uncharged or lightly charged neutral buoyancy particles is in the range of about 100 nanometers to about 5 microns.

In one embodiment, the concentration of the uncharged or lightly charged neutral buoyancy particles in an electrophoretic fluid is more than 2.5% by weight, but not exceeding about 25% by weight. In one embodiment, the concentration of the uncharged or lightly charged neutral buoyancy particles in an electrophoretic fluid is in a range between about 3% to about 15% by weight. In one embodiment, the concentration of the uncharged or lightly charged neutral buoyancy particles in an electrophoretic fluid is in a range between about 3% to about 10% by weight.

In a second aspect of the present invention, the additive particles are transparent particles. In one embodiment, the charged pigment particles are non-transparent. In one embodiment, the refractive index of the transparent particles is substantially the same as that of the solvent in which they are dispersed. In one embodiment, the refractive index is lower than 1.5. In one embodiment, the transparent particles take up less than 20% by volume of the fluid. In another embodiment, the transparent particles take up less than 10% by volume of the fluid. In one embodiment, the transparent particles are formed from an organic material. In another embodiment, the transparent particles are formed from an inorganic material. In one embodiment, the transparent particles are formed from a monomer or oligomer selected from the group consisting of acrylate or methacrylate, siloxane modified acrylate or methacrylate and halogenated acrylate or methacrylate. In one embodiment, the transparent particles have an average size of less than 0.5 μm, or less than 0.3 μm or less than 0.1 μm.

In one embodiment, the non-transparent charged pigment particles are white particles which carry a positive or negative charge polarity. In another embodiment, the non-transparent charged pigment particles are black and white particles carrying opposite charge polarities.

In one embodiment, the transparent particles are non-charged. In another embodiment, the transparent particles are charged. In a further embodiment, the transparent particles carry a charge the polarity of which is the same as that carried by one type of the non-transparent charged pigment particles, but have a different level of mobility than that of the non-transparent charged pigment particles.

In the present invention, the solvent in an electrophoretic fluid may be a hydrocarbon solvent. Alternatively, the solvent may be halogenated or fluorinated. The fluid may further comprise a charge control agent.

In a third aspect of the present invention, an electrophoretic display comprises display cells which are filled with an electrophoretic fluid as described above. In one embodiment, the display cells are cup-like microcells. In another embodiment, the display cells are microcapsules.

In addition, the additive particles in an electrophoretic fluid of the present invention are not seen at the viewing side where the images are viewed.

DETAILED DESCRIPTION OF THE INVENTION

The present inventors have discovered that by including additive particles in an electrophoretic fluid, a display device can have not only improved image stability but also improved contrast ratio, without significantly affecting the switching speed.

The charge intensity referred to in the application may be measured in terms of zeta potential. In one embodiment, the zeta potential is determined by Colloidal Dynamics AcoustoSizer IIM with a CSPU-100 signal processing unit, ESA EN # Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to between 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential.

The term "lightly charged" is defined as having a charge which is less than 50%, preferably less than 25% and more preferably less than 10%, of the average charge carried by the positively charged pigment particles or negatively charged pigment particles.

In a first aspect of the present invention, the additive particles are uncharged or slightly charged neutral buoyancy particles.

The term "neutral buoyancy" refers to particles which do not rise or fall with gravity. In other words, the particles would float in the fluid between the two electrode plates. In one embodiment, the density of the neutral buoyancy particles may be the same as the density of the solvent or solvent mixture in which they are dispersed.

The movement of the particles in an electrophoretic fluid which are uncharged or slightly charged and of neutral buoyancy is not influenced by the electric field generated by the electrode plates. In addition, because of the low concentration (see in a section below), the color of the uncharged or slightly charged neutral buoyancy particles is not seen at viewing side of a display device. In other words, only the color(s) of the charged pigment particles in the fluid is/are visible at the viewing side of the display device.

Figure 1:
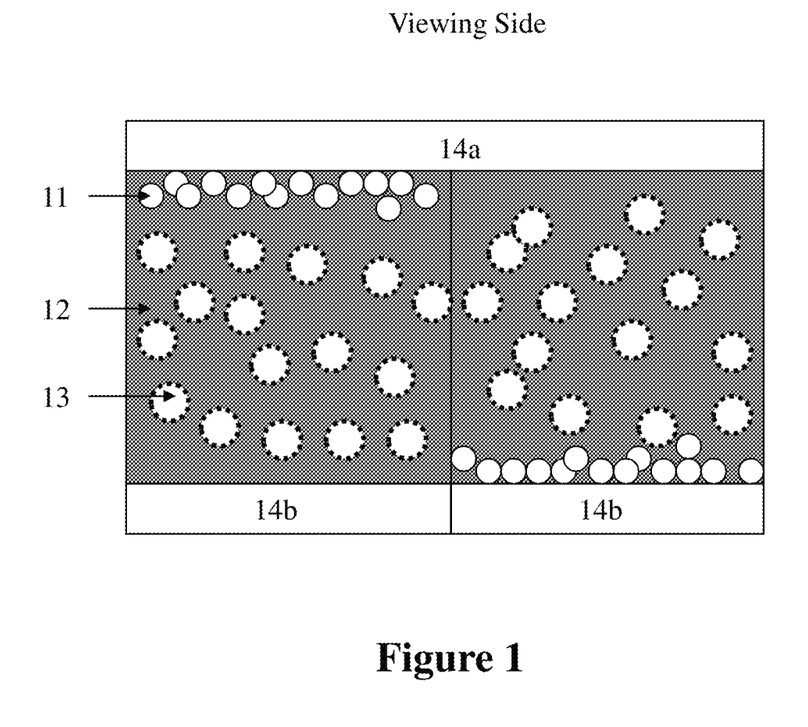
FIG. 1 depicts an electrophoretic fluid comprising one type of charged pigment particles and also additive particles, both dispersed in a solvent or solvent mixture.

An electrophoretic fluid comprises one type of charged pigment particles (11) and additive particles (which may be un-charged neutral buoyancy particles) (13), both dispersed in a dielectric solvent or solvent mixture (12), as shown in FIG. 1 (i.e., "one particle system"). The charged pigment particles (11) would move to be at or near one of the electrodes (14a or 14b), depending on the voltage potential applied to the electrodes and the charge polarity carried by the charged pigment particles (11). One of the two electrodes is on the viewing side which is where the images are viewed.

The charged pigment particles (11) may be formed from an inorganic pigment, such as $TiO_2$, $ZrO_2$, ZnO, $Al_2O_3$, CI pigment black 26 or 28 or the like (e.g., manganese ferrite black spinel or copper chromite black spinel). They also may be formed from an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher.

The charged pigment particles may also be particles coated with a polymer layer on their surface and the polymer coating can be prepared through various conventionally known polymerization techniques.

The charged pigment particles may carry a natural charge or are charged through the presence of a charge controlling agent.

The uncharged or lightly charged neutral buoyancy particles (13) may be formed from a polymeric material. The polymeric material may be a copolymer or a homopolymer.

Examples of the polymeric material for the uncharged or lightly charged neutral buoyancy particles may include, but are not limited to, polyacrylate, polymethacrylate, polystyrene, polyaniline, polypyrrole, polyphenol, polysiloxane or the like. More specific examples of the polymeric material may include, but are not limited to, poly(pentabromophenyl methacrylate), poly(2-vinylnapthalene), poly(naphthyl methacrylate), poly(alpha-methystyrene), poly(N-benzyl methacrylamide) or poly(benzyl methacrylate). These materials are suitable for the neutral buoyancy particles in a system having one, two or more types of the charged pigment particles.

More preferably, the uncharged or lightly charged neutral buoyancy particles are formed from a polymer which is not soluble in the dielectric solvent of the display fluid, and also has a high refractive index. In one embodiment, the refractive index of the uncharged or lightly charged neutral buoyancy particles is different from that of the solvent or solvent mixture in which the particles are dispersed. However, typically the refractive index of the uncharged or lightly charged neutral buoyancy particles is higher than that of the solvent or solvent mixture. In some cases, the refractive index of the uncharged or lightly charged neutral buoyancy particles may be above 1.45.

In one embodiment, the materials for the uncharged or lightly charged neutral buoyancy particles may comprise an aromatic moiety.

The uncharged or lightly charged neutral buoyancy particles may be prepared from monomers through polymerization techniques, such as suspension polymerization, dispersion polymerization, seed polymerization, soap-free polymerization, emulsion polymerization or physical method, including inverse emulsification-evaporation process. The monomers are polymerized in the presence of a dispersant. The presence of the dispersant allows the polymer particles to be formed in a desired size range and the dispersant may also form a layer physically or chemically bonded to the surface of the polymer particles to prevent the particles from agglomeration.

The dispersants preferably has a long chain (of at least eight atoms), which may stabilize the polymer particles in a hydrocarbon solvent. Such dispersants may be an acrylate-terminated or vinyl-terminated macromolecule, which are suitable because the acrylate or vinyl group can co-polymerize with the monomer in the reaction medium.

One specific example of the dispersant is acrylate terminated polysiloxane (Gelest, MCR-M17, MCR-M22), Another type of suitable dispersants is polyethylene macromonomers, as shown below:

The backbone of the macromonomer may be a polyethylene chain and n may be 30-200. The synthesis of this type of macromonomers may be found in Seigou Kawaguchi et al, Designed Monomers and Polymers, 2000, 3, 263.

If the fluid system is fluorinated, the dispersants are then preferably also fluorinated.

Alternatively, the uncharged or lightly charged neutral buoyancy particles may also be formed from a core particle coated with a polymeric shell and the shell may be formed, for example, from any of the polymeric material identified above.

The core particle may be of an inorganic pigment such as $TiO_2$, $ZrO_2$, ZnO, $Al_2O_3$, Cl pigment black 26 or 28 or the like (e.g., manganese ferrite black spinel or copper chromite black spinel), or an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher or the like.

In the case of core-shell uncharged or lightly charged neutral buoyancy particles, they may be formed by a micro-encapsulation method, such as coacervation, interfacial polycondensation, interfacial cross-linking, in-suit polymerization or matrix polymerization.

The size of the uncharged or lightly charged neutral buoyancy particles is preferably in the range of about 100 nanometers to about 5 microns.

The uncharged or lightly charged neutral buoyancy particles may be opaque.

In one embodiment as shown in FIG. 2, an electrophoretic fluid may comprise two types of charged pigment particles (21a and 21b) and uncharged or lightly charged neutral buoyancy particles (23), all dispersed in a solvent or solvent mixture (22) (i.e., "two particle system"). The movement of the charged pigment particles is determined by the voltage potential applied to the electrodes (24a and 24b).

The two types of charged pigment particles have different optical characteristics. For example, they have contrasting colors and carry opposite charge polarities.

In one embodiment, an electrophoretic fluid may comprise more than two types of charged pigment particles.

Each of the types (two or more) of the charged pigment particles may have the same characteristics discussed above for the charged particles in the one particle system.

The suitable materials for the uncharged or lightly charged neutral buoyancy particles in a system having two or more types of charged pigment particles may be the same as those described above for the one particle system.

In an electrophoretic fluid comprising two types of charged pigment particles carrying opposite charge polarities and are of contrasting color, the particles preferably have a polymer layer on their surface to prevent them from sticking to each other. Otherwise, in the case of a black/white display device, the reflectance at the white and black states may suffer.

In one embodiment of this aspect of the present invention, the uncharged or lightly charged neutral buoyancy particles (23) added to the fluid may have a color substantially the same visually as the color of one of the two types of charged pigment particles. For example, in a display fluid, there may be charged black particles, charged white particles and uncharged or lightly charged neutral buoyancy particles and the uncharged or lightly charged neutral buoyancy particles may be either white or black.

In another embodiment, the uncharged or lightly charged neutral buoyancy particles may have a color substantially different from the color of either one of the two types of charged pigment particles.

Figure 2A:
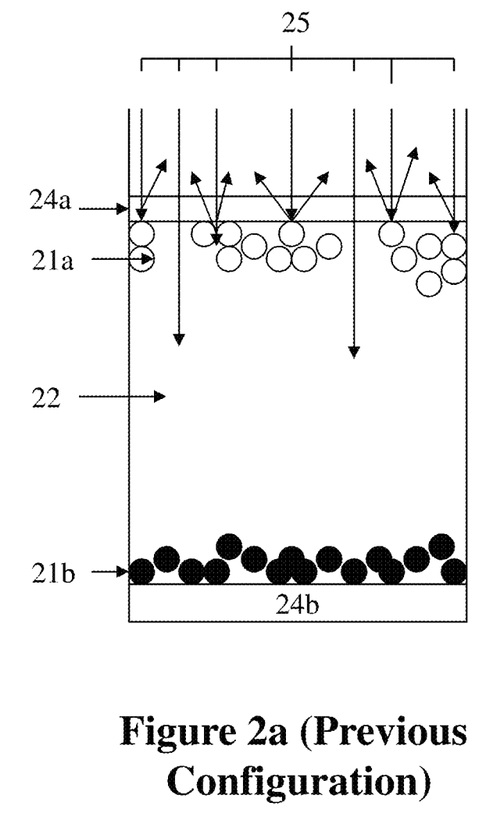
FIGS. 2a-2d show how the uncharged or lightly charged neutral buoyancy particles may improve the performance of an electrophoretic fluid which comprises two types of charged pigment particles.
Figure 2B:
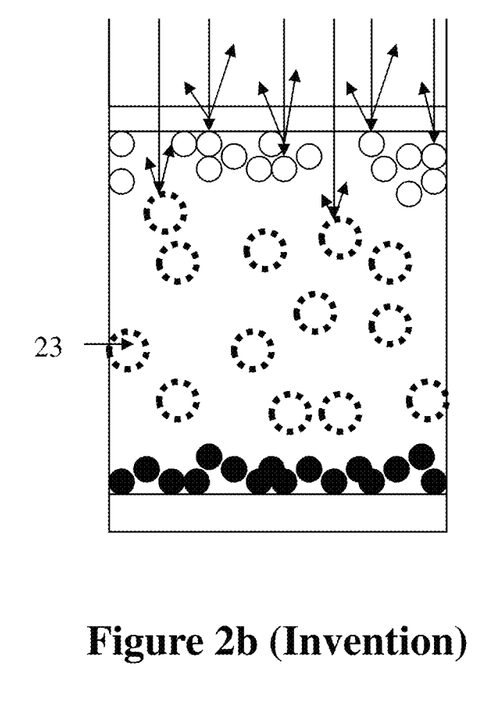

FIGS. 2a & 2b show how the contrast ratio may be improved by the addition of the uncharged or lightly charged neutral buoyancy particles in a two particle system. As shown, the presence of the uncharged or lightly charged neutral buoyancy particles, especially if they are formed from a reflective material, increases reflection of the incident light (25); thus improving the contrast ratio.

Figure 2C:
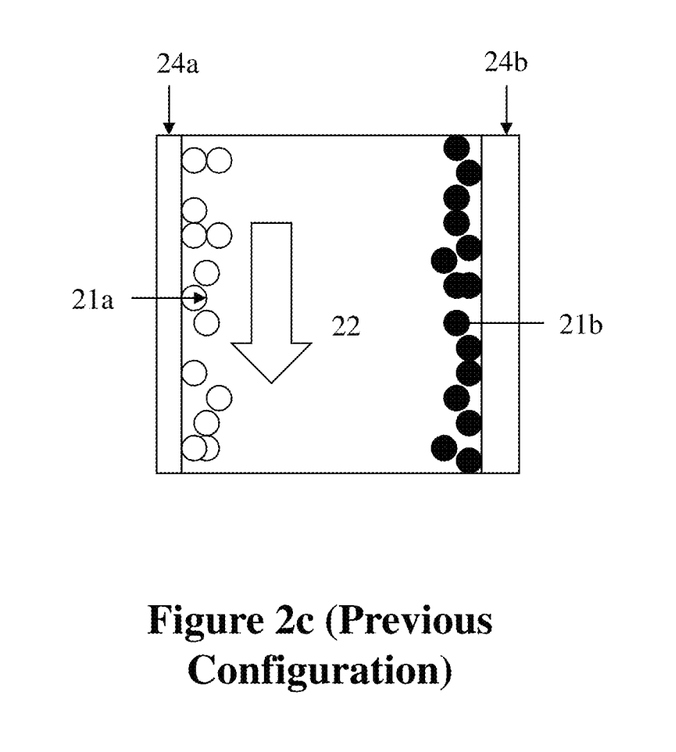
Figure 2D:
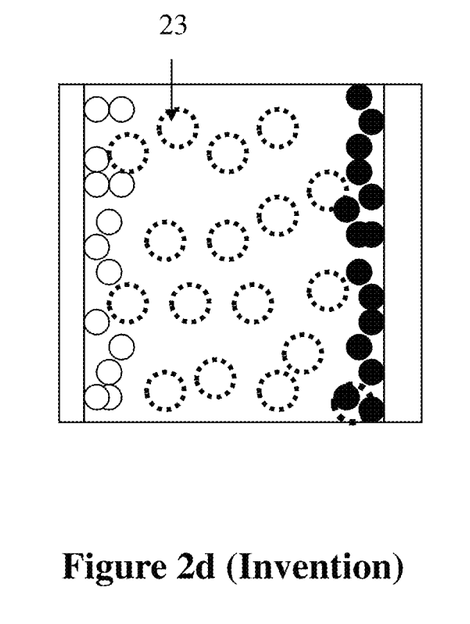

FIGS. 2c & 2d show how the image stability may be improved by the addition of the uncharged or lightly charged neutral buoyancy particles in a two particle fluid system. The un-charged neutral buoyancy particles can fill in the gaps resulted from the charged pigment particles being over packed on the surface of an electrode under a driving electrical field, thus preventing the charged pigment particles from settling due to the gravitational force.

In addition, if the uncharged or lightly charged neutral buoyancy particles are white, they may enhance the reflectivity of the display. If they are black, they may enhance the blackness of the display.

In a further embodiment of the present invention, the concentration of the uncharged or lightly charged neutral buoyancy particles in an electrophoretic fluid is preferably more than 2.5% by weight, but not exceeding about 25% by weight. In another embodiment, the concentration of the uncharged or lightly charged neutral buoyancy particles is preferably in a range between about 3% to about 15% by weight and more preferably in a range between about 3% to about 10% by weight. The color of the uncharged or lightly charged neutral buoyancy particles is not seen at the viewing side during operation of the display device.

In a second aspect of the present invention, the additive particles (13) in FIG. 1 are transparent particles which may be charged or uncharged. The transparent particles are usually colorless. They are also not seen at the viewing side during operation of the display device.

In one embodiment, the transparent particles have a refractive index preferably lower than 1.5, more preferably to be about 1.4. The refractive index of the transparent particles is substantially the same as the refractive index of the solvent in the electrophoretic fluid, so that the transparent particles do not scatter light and are transparent or close to be transparent in the fluid. The term "substantially the same" refers to the difference between the two refractive indices not exceeding 10%.

The amount of the transparent particles in an electrophoretic fluid is preferably less than 20% and more preferably less than 10%, by volume.

The transparent particles may be formed of an organic material, such as a polymeric material. In this case, the starting monomers or oligomers may be acrylate or methacrylate, siloxane modified acrylate or methacrylate, halogenated acrylate or methacrylate or monomers that can form a polyurethane.

The monomers or oligomers undergo emulsion polymerization, seed polymerization, soap-free polymerization, dispersion polymerization, suspension polymerization, phase inversion polymerization or the like, to form the transparent particles.

Examples of the resulting material from polymerization may include, but are not limited to, poly(methyl methacrylate), poly(butyl acrylate), poly(perfluorobutylethyl acrylate), poly(perfluorohexyl ethyl methacrylate) and poly(methacrylate terminated dimethylsiloxanes).

In the polymerization process, a dispersant is preferably present. The dispersant allows the transparent particles to be formed in a desired average size range (e.g., less than 0.5 µm, preferably less than 0.3 µm and more preferably less than 0.1 µm). The dispersant may also cause formation of a layer physically or chemically bonded to the surface of the transparent particles to prevent the particles from agglomeration in the electrophoretic fluid.

The term "dispersant", in the context of the present application, broadly includes any materials which promote dispersion or to maintain dispersed particles in a suspension state. Dispersants particularly suitable for the purpose of the present invention preferably have a long chain (of at least eight carbon atoms or Si—O repeating units) and therefore they can stabilize the transparent particles in a solvent in the polymerization process or in the final fluid. Such dispersants may be an acrylate-terminated or vinyl-terminated macromolecule. They are suitable because the acrylate or vinyl group can co-polymerize with the monomers or oligomers in the polymerization process.

One specific example of the dispersant is acrylate terminated polysiloxane (Gelest, MCR-M17, MCR-M22), as shown below:

The molecular weight of the polysiloxane of the above formula is higher than 5000.

Another specific example is polyethylene macromonomer of the following formula:

As discussed above, the backbone of this macromonomer may be a polyethylene chain and n may be 30-200. The synthesis of this type of macromonomers may be found in Seigou Kawaguchi et al, Designed Monomers and Polymers, 2000, 3, 263.

If the fluid system is fluorinated or halogenated, the dispersants are then preferably also fluorinated or halogenated.

In another embodiment, the transparent particles can be made from an inorganic material, such as silica, with a refractive index lower than 1.5.

The transparent particles of the present invention may be added to an electrophoretic fluid comprising one type, two types or multiple types of charged pigment particles dispersed in a solvent or solvent mixture, as an additive. In a one particle system, one type of charged pigment particles is dispersed in a solvent or solvent mixture. In a two particle system, two types of pigment particles of contrasting colors and carrying opposite charge polarities are dispersed in a solvent or solvent mixture. In a multiple particle system, there may be more than two types of pigment particles of different colors and the multiple types of particles may have different charge polarities, different levels of charge intensity or different levels of mobility. The charged pigment particles referred to in the one particle system, the two particle system or the multiple particle system, are non-transparent particles.

The transparent particles are useful as an additive in an electrophoretic fluid. For example, when the transparent particles are non-charged, they can reduce agglomeration between the charged particles, thus also reducing the ghosting phenomenon during driving; but they do not have a negative impact on the color exhibition. When the transparent particles are non-charged, they show no mobility under an electric field.

If the transparent particles have the same level of charge intensity as, or a higher level of charge intensity than, the charge intensity of the charged non-transparent particles, they can compete with the non-transparent particles to prevent the non-transparent particles from sticking to a dielectric layer.

When the transparent particles are charged, they may carry a charge the polarity of which is the same as that carried by one type of the charged pigment particles, and in this case, the transparent particles have a different level of mobility than that of the other particles in the fluid.

Example

In a three-neck reaction flask, 200 ml of solvent (silicone oil, DMS-T01 from Gelest) is added, followed by adding 32 g of a stabilizer (MCR-M22, Gelest) to the solvent. To the resulting mixture, 16 g of a monomer (methyl methacrylate) is added. Nitrogen is then purged into the flask and the temperature is increased to 65° C. while stirring. An initiator, LPO (lauryl peroxide), in the amount of about 0.4 g, is added into the flask. The reaction continues for 15 hours, after which polymer particles are formed. The polymer particles can be separated from the liquid through centrifugation to remove un-reacted species, and re-dispersed into a solvent (Isopar G).

A further aspect of the present invention is directed to an electrophoretic display wherein display cells are filled with any of the display fluids as described in the present application.

The term "display cell" refers to a micro-container filled with a display fluid. A display cell may be a cup-like microcells as described in U.S. Pat. No. 6,930,818, the content of which is incorporated herein by reference in its entirety.

A display cell may also be any other micro-containers (e.g., microcapsules or microchannels), regardless of their shapes or sizes. All of these are within the scope of the present application, as long as the micro-containers are filled with a display fluid.

The solvent or solvent mixture (12) in which the charged pigment particles and additive particles are dispersed preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Delaware, polydimethylsiloxane based silicone oil from Dow-corning (DC-200). The solvent or solvent mixture may be colored by a dye or pigment.

More specifically, the solvent in the electrophoretic fluid may be a hydrocarbon solvent, such as dodecane, tetradecane, the aliphatic hydrocarbons in the Isopar® series (Exxon, Houston, Tex.) or the like. The solvent can also be a mixture of a hydrocarbon and a halogenated carbon or silicone oil base material.

An electrophoretic fluid of the present invention may further comprise a charge control agent, which may be polymeric, non-polymeric, ionic or non-ionic. The charge control agent may be an ionic surfactant, such as sodium dodecylbenzenesulfonate, metal soap, polybutene succinimide, maleic anhydride copolymers, vinylpyridine copolymers, vinylpyrrolidone copolymer, (meth)acrylic acid copolymers or N,N-dimethylaminoethyl (meth)acrylate copolymers), Alcolec LV30 (soy lecithin), Petrostep B100 (petroleum sulfonate) or B70 (barium sulfonate), Solsperse 17000 (active polymeric dispersant), Solsperse 9000 (active polymeric dispersant), OLOA 11000 (succinimide ashless dispersant), OLOA 1200 (polyisobutylene succinimides), Unithox 750 (ethoxylates), Petronate L (sodium sulfonate), Disper BYK 101, 2095, 185, 116, 9077 & 220 and ANTI-TERRA series.

The charge control agent used in all embodiments of the present invention is compatible with the solvent in the electrophoretic fluid and may interact with the surface of the charged particles to effectively generate either positive or negative charge for the particles.

The term "about" in the present application refers to a range which is ±5% of the indicated value.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:
1. A display comprising:
two electrodes; and
an electrophoretic fluid disposed between the electrodes, the electrophoretic fluid comprising:
two types of charged pigment particles that have opposite charges, and
neutral buoyancy particles, wherein the neutral buoyancy particles are uncharged or have a charge which is less than 50% of the average charge carried by the charged pigment particles,
wherein all types of particles are dispersed in a solvent or solvent mixture, and
the concentration of the neutral buoyancy particles in the electrophoretic fluid does not exceed 25% by weight,
wherein the two types of charged pigment particles move to opposed electrodes when a voltage difference is applied between the two electrodes,
wherein only a color of the charged pigment particles is visible at a viewing side of the display for all voltage differences applied between the two electrodes.

2. The display of claim 1, wherein the neutral buoyancy particles have the same color as one type of charged pigment particles.

3. The display of claim 1, wherein the neutral buoyancy particles have a color different from that of the charged pigment particles.

4. The display of claim 1, wherein the neutral buoyancy particles are formed from a material selected from the group consisting of polyacrylate, polymethacrylate, polystyrene, polyaniline, polypyrrole, polyphenol and polysiloxane.

5. The display of claim 1, wherein the neutral buoyancy particles are formed from a material selected from the group consisting of poly(pentabromophenyl methacrylate), poly(2-vinylnapthalene), poly(naphthyl methacrylate), poly(alpha-methystyrene), poly(N-benzyl methacrylamide) and poly(benzyl methacrylate).

6. The display of claim 1, wherein the neutral buoyancy particles are formed from a material having a refractive index different from that of the solvent or solvent mixture.

7. The display of claim 1, wherein the concentration of the neutral buoyancy particles in the electrophoretic fluid does not exceed 15% by weight.

8. The display of claim 1 wherein the concentration of the neutral buoyancy particles in the electrophoretic fluid does not exceed 10% by weight.

9. The display of claim 1 wherein the refractive index of the neutral buoyancy particles is the same as that of the solvent or solvent mixture.

10. The display of claim 1 wherein the refractive index of the neutral buoyancy particles is different than that of the solvent or solvent mixture.

11. The display of claim 1, wherein the neutral buoyancy particles take up less than 20% by volume of the fluid.

12. The display of claim 1, wherein the neutral buoyancy particles take up less than 10% by volume of the fluid.

13. The display of claim 1, wherein the neutral buoyancy particles are uncharged or have a charge which is less than 25% of the average charge carried by the charged pigment particles.

14. The display of claim 1, wherein the neutral buoyancy particles are uncharged or have a charge which is less than 10% of the average charge carried by the charged pigment particles.

15. The display of claim 1, wherein the size of the neutral buoyancy particles is in the range of 100 nanometers to 5 microns.

16. The electrophoretic display of claim 1 further comprising a plurality of microcells containing the electrophoretic fluid.

17. The electrophoretic display of claim 1 further comprising a plurality of microcapsules containing the electrophoretic fluid.

* * * * *